(12) United States Patent
Gupta et al.

(10) Patent No.: US 9,729,401 B2
(45) Date of Patent: Aug. 8, 2017

(54) AUTOMATIC REMEDIATION OF POOR-PERFORMING VIRTUAL MACHINES FOR SCALABLE APPLICATIONS

(71) Applicant: VMware, Inc., Palo Alto, CA (US)

(72) Inventors: Vishal Gupta, Mountain View, CA (US); Pradeep Padala, San Jose, CA (US); Anne Holler, Los Altos, CA (US); Aalap Desai, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 72 days.

(21) Appl. No.: 14/592,877

(22) Filed: Jan. 8, 2015

(65) Prior Publication Data

US 2016/0057041 A1    Feb. 25, 2016

Related U.S. Application Data

(60) Provisional application No. 62/040,980, filed on Aug. 22, 2014.

(51) Int. Cl.
| | |
|---|---|
| *G06F 9/455* | (2006.01) |
| *H04L 12/24* | (2006.01) |
| *G06F 11/30* | (2006.01) |
| *G06F 11/34* | (2006.01) |
| *G06N 99/00* | (2010.01) |
| *G06F 9/445* | (2006.01) |

(52) U.S. Cl.
CPC ........ *H04L 41/142* (2013.01); *G06F 9/45558* (2013.01); *G06F 11/301* (2013.01); *G06F 11/3409* (2013.01); *H04L 41/0896* (2013.01); *H04L 41/16* (2013.01); *H04L 41/5025* (2013.01); *G06F 9/44505* (2013.01); *G06F 9/45545* (2013.01); *G06F 11/3466* (2013.01); *G06F 2009/45591* (2013.01); *G06F 2201/81* (2013.01); *G06F 2201/865* (2013.01); *G06N 99/005* (2013.01); *H04L 41/5096* (2013.01)

(58) Field of Classification Search
CPC ..................................................... G06F 9/455
See application file for complete search history.

(56) References Cited

U.S. PATENT DOCUMENTS

| | | | |
|---|---|---|---|
| 2012/0323853 A1* | 12/2012 | Fries ..................... | G06F 11/301 |
| | | | 707/649 |
| 2015/0007173 A1 | 1/2015 | Ionescu et al. | |
| 2015/0058265 A1 | 2/2015 | Padala et al. | |

OTHER PUBLICATIONS

Amazon.com, Amazon Elastic Compute Cloud (EC2), http://aws.amazon.com/ec2/, retrieved Nov. 20, 2014.
Breunig et al., "LOF: Identifying Density-Based Local Outliers," In Proceedings of the 2000 ACM SIGMOD International Conference on Management of Data, SIGMOD '00, pp. 93-104, ACM, 2000.

(Continued)

*Primary Examiner* — Stanley K Hill
*Assistant Examiner* — Ola Olude Afolabi

(57) ABSTRACT

A management system and method for remediating poor-performing clients running in a distributed computer system uses a machine learning technique to automatically detect one or more poor-performing clients among a plurality of clients running in the distributed computer based on at least performance data and resource usage data of the clients. An action is then initiated to mitigate the effects of the poor-performing clients.

21 Claims, 5 Drawing Sheets

(56) References Cited

OTHER PUBLICATIONS

Cherkasova et al., "Automated Anomaly Detection and Performance Modeling of Enterprise Applications," ACM Trans. Computer Systems, 27(3):6:1-6:32, Nov. 2009.
Dean et al., "UBL: Unsupervised Behavior Learning for Predicting Performance Anomalies in Virtualized Cloud Systems," In Proceedings of the 9th International Conference on Autonomic Computing, ICAC '12, pp. 191-200. ACM, 2012.
Holmes et al., "WEKA: A Machine Learning Workbench," In Proc Second Australia and New Zealand Conference on Intelligent Information Systems, Brisbane, Australia, 1994.
VMware.com, App HA: VMware vSphere with Operations Management, http://www.vmware.com/products/vsphere/features/application-HA.html, retrieved Nov. 20, 2014.
VMware.com, HYPERIC: Systems Monitoring, Server Monitoring, & Systems Management Software, http://www.hyperic.com/, retrieved Nov. 20, 2014.

* cited by examiner

AUTOMATIC REMEDIATION OF POOR-PERFORMING VIRTUAL MACHINES FOR SCALABLE APPLICATIONS

CROSS REFERENCE TO RELATED APPLICATION

This application is entitled to the benefit of U.S. Provisional Patent Application Ser. No. 62/040,980, filed on Aug. 22, 2014, which is incorporated herein by reference.

BACKGROUND

Virtualized infrastructures are widely used to provide large-scale services, which typically involve executing multi-tier applications. Automation is key in enabling management of these large-scale services, where human handling of various tasks such as deployment, upgrades, recovery, etc. becomes infeasible. In order to maintain a smooth flow of services performed by virtual machines running in a virtualized infrastructure where failures are not uncommon, detecting performance anomalies is a critical as well as a challenging task. While many routine tasks related to normal operation of a service can be automated, detecting abnormal behavior is complicated due to its undefined nature.

Performance anomalies can be of two broad categories in nature: complete unavailability or poor quality-of-service (QoS). There exist many techniques aimed at handling the former kind of scenarios where dead (either crashed or isolated) hosts or virtual machines are detected through network and storage heartbeat-based mechanisms. These techniques work well since unavailable hosts and virtual machines can be easily detected by their lack of response. However, poorly performing virtual machines are more difficult to detect because poor performance of a virtual machine depends on many factors and is not easily definable. Various techniques have been proposed to detect such anomalous virtual machines using reference/prediction mechanisms. These techniques typically use an application model or signature, either developed offline and learned online. Based on this model, the state of the application is determined as either healthy or unhealthy. However, there are several drawbacks with such methods. Application models are very specific to the application and platform configuration. These models need to be adapted for various execution environments. Further, developing an accurate model of the application may involve large number of metrics which may require specialized support from the monitoring infrastructure.

Another technique for handling poorly performing virtual machines involves the notion of "health checking" using an agent that monitors the health of the virtual machines based on the user specified configurations and marks any virtual machines that do not meet the healthy condition criteria as unhealthy. However, this functionality is quite limited as it requires the users to define the poorly performing behavior of the virtual machines.

SUMMARY

A management system and method for remediating poor-performing clients running in a distributed computer system uses a machine learning technique to automatically detect one or more poor-performing clients among a plurality of clients running in the distributed computer based on at least performance data and resource usage data of the clients. An action is then initiated to mitigate the effects of the poor-performing clients.

A method for remediating poor-performing clients running in a distributed computer system in accordance with an embodiment of the invention comprises automatically detecting a poor-performing client among a plurality of clients running in the distributed computer using a machine learning technique based on performance data and resource usage data of the clients, and initiating an action to mitigate effects of the poor-performing client. In some embodiments, the steps of this method are performed when program instructions contained in a computer-readable storage medium are executed by one or more processors.

A management system supported by hardware in a distributed computer system in accordance with an embodiment of the invention comprises a poor-performing client detector configured to automatically detect a poor-performing client among a plurality of clients running in the distributed computer using a machine learning technique based on performance data and resource usage data of the clients, and a poor-performing client mitigator configured to initiate an action to mitigate effects of the poor-performing client.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
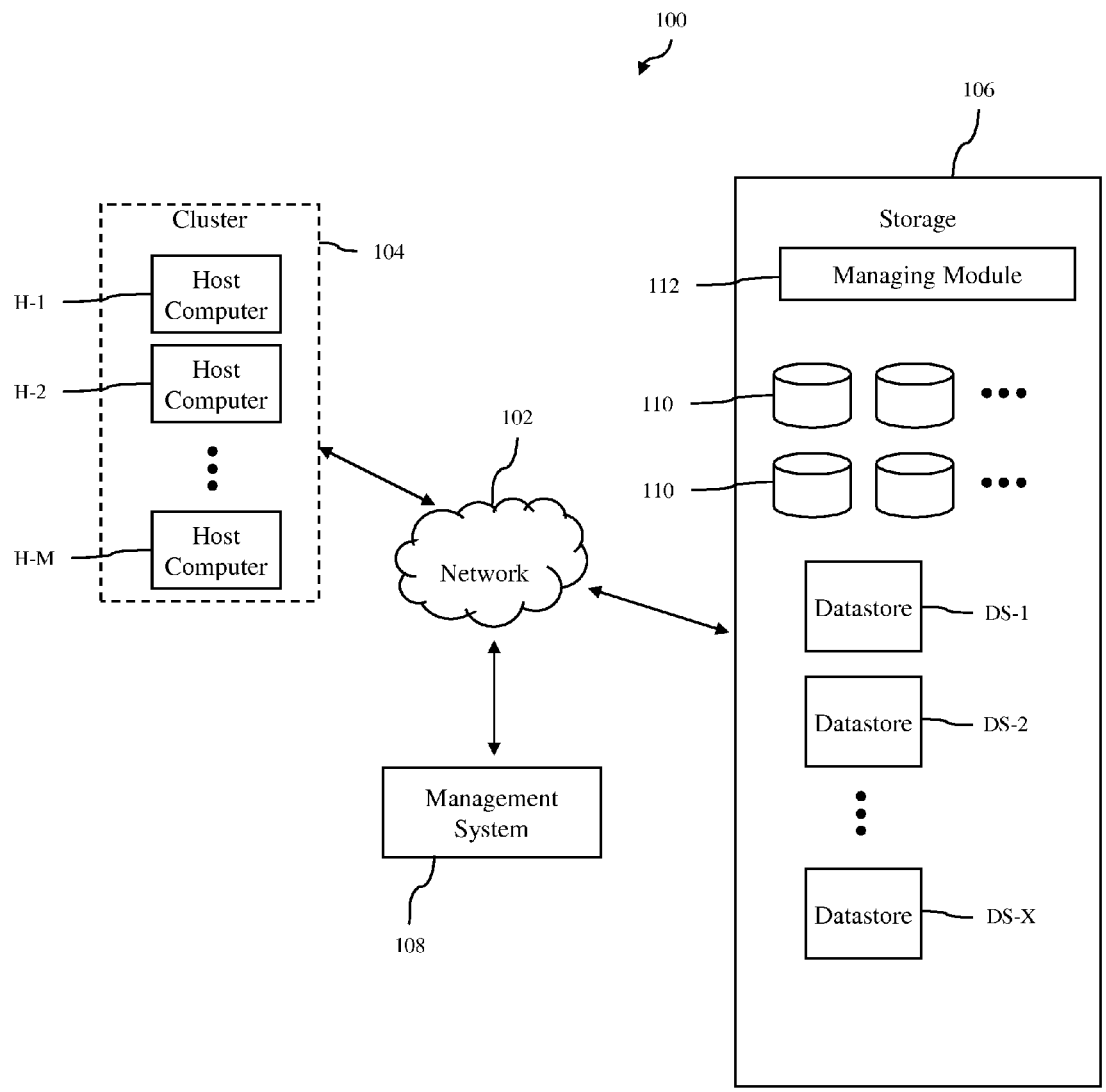
FIG. 1 is a block diagram of a distributed computer system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Virtual machines (VMs) can exhibit performance variations and degradations in cloud environments due to various software issues such as memory leaks, bugs, etc. It is critical to remediate such behaviors to manage large scale systems, where performance issues are common, because poorly performing VMs can significantly impact the efficiency or even feasibility of meeting a service level agreement (SLA). These poorly performing VMs will be referred to herein as "poor-performing" VMs, which are VMs that exhibit poor performance relative to comparable VMs, as explained in more detail below.

An example will now be used to illustrate the impact that poor-performing VMs can have on the efficiency or even feasibility of meeting a SLA. This example involves a three-tier application having a load balancer tier, an application (app) server tier and a database tier, where the app server tier is the only scalable tier. In this example, the overall SLA for this application is an average request time of two (2) seconds and the application is currently meeting the SLA at an average of 1.9 seconds, with the load balancer tier taking an average of 300 ms, the database tier taking an average of 600 ms, and the app server tier (comprising 2 VMs) taking an average of 1000 ms. Consider a scenario when one of the app server VMs becomes a poor-performing VM and its average latency increases to 1500 ms. Assuming the requests are proportionally sent to the poor-performing VM, it will take five (5) VMs in the application server tier to meet the SLA. In contrast, without the poor-performing VM, the SLA could be met by two (2) VMs. If the user sets a limit of four (4) VMs in the app server tier, the SLA could not be met at all. Even assuming the load balancer responded to the poor-performing VM by giving it much fewer requests or even none, one would expect at least one extra VM would be needed beyond the number needed if there were no poor-performing VMs in the app server tier.

Embodiments in accordance with the invention provide a mechanism to detect and remediate poor-performing VMs in a computing environment, which may be a cloud environment. This mechanism is fully automated, and thus, do not require a user to define what constitutes "poor-performing" VMs.

Turning now to FIG. 1, a distributed computer system 100 in accordance with an embodiment of the invention is shown. As shown in FIG. 1, the distributed computer system includes a network 102, a cluster 104 of host computers H-1, H-2 . . . H-M (where M is a positive integer), storage 106, and a management system 108. As described in more detail below, the management system is able to detect and mitigate poor-performing VMs running in the cluster of host computers. The host computers, the storage and the management system are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that hosts or supports one or more VMs so that the VMs are executing on the physical computer systems. Although VMs are used herein to describe various embodiments in accordance with the invention, these embodiments may be applied to any software entities or clients that can run on a computer system, such as software applications, software processes and "containers" that provide system-level process isolation. The host computers may be servers that are commonly found in datacenters. As an example, the host computers may be servers installed in a single server rack. However, in other embodiments, the host computers may be installed in multiple server racks in the same or different facilities.

Figure 2:
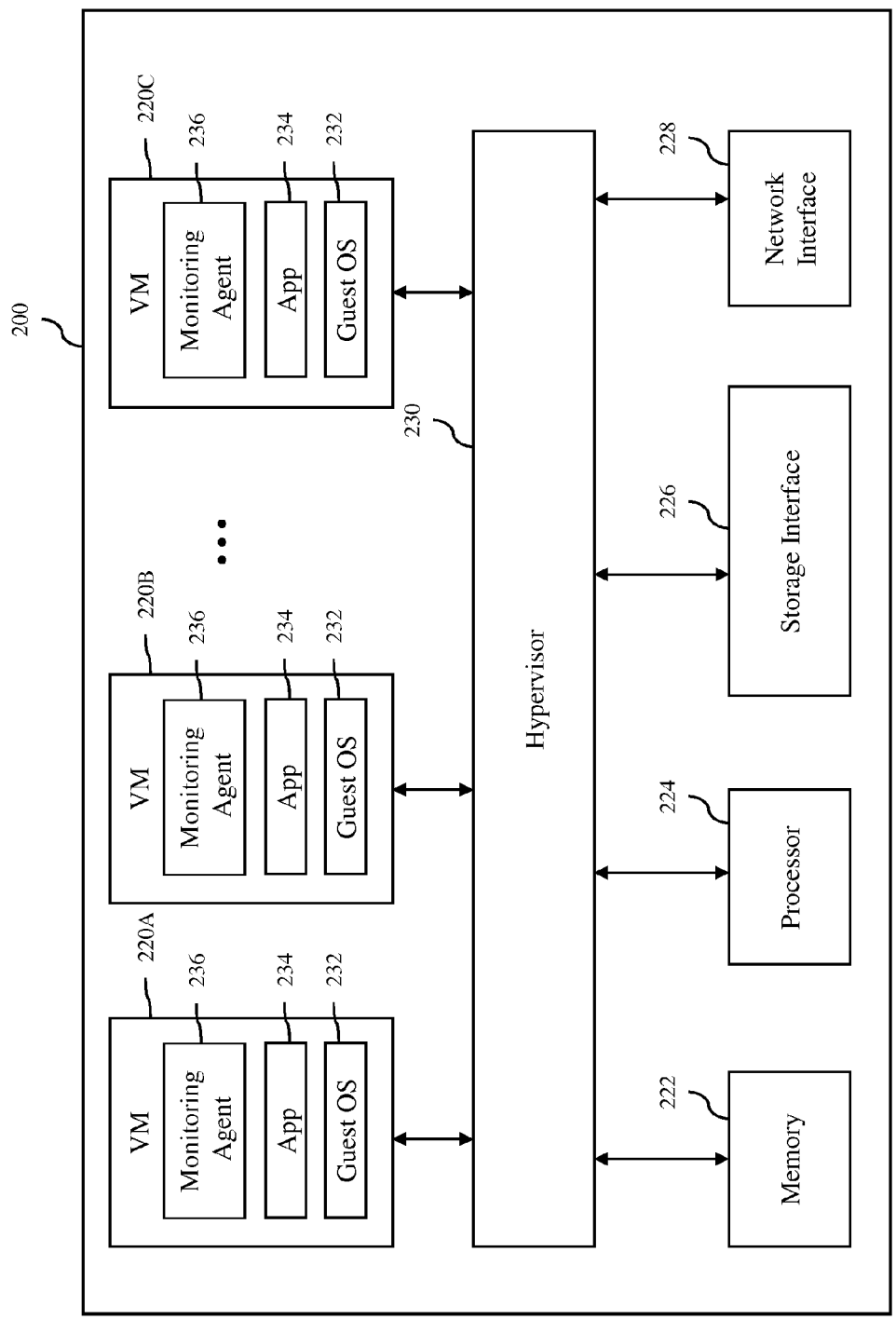
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer) in the form of VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. The storage interface 226 is an interface that allows the host computer to communicate with the storage 106. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM includes a guest operating system (OS) 232, one or more guest applications (APP) 234 and a monitoring agent 236. The guest operating system is a master control program of the respective VM and, among other things, the guest operating system forms a software platform on top of which the guest applications run. The monitoring agent is a software program running in the VM to monitor and report resource metrics for that VM to the management system 108. These resource metrics reflect availability, performance, utilization, and throughput for each resource type being monitored, such as CPU, memory, storage and network. In an embodiment, the monitoring agent is a Hyperic Agent that reports to a Hyperic Server, which may be included in the management system 108.

Similar to any other computer system connected to the network 102, the VMs 220A, 220B . . . 220L are able to communicate with each other using an internal software OSI Layer 2 switch (not shown) and with other computer systems connected to the network using the network interface 228 of the host computer 200. In addition, the VMs are able to access the storage 106 using the storage interface 226 of the host computer.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 106 is used to store data for the host computers H-1, H-2 . . . H-M of the cluster 104, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the cluster. For virtual machines, the datastores may be used to store virtual storage, e.g., virtual disks, used by each of the virtual machines, as well as other files needed to support the virtual machines.

The management system 108 operates to monitor and manage the host computers H-1, H-2 . . . H-M in the cluster 104, including the clients, e.g., VMs, running on the host computers. In an embodiment, the management system is configured to perform various resource management operations for the cluster, such as, but not limited to, resource allocation, load balancing and placement of clients on different host computers in the cluster. In addition, the management system is further configured to remediate performance degradation caused by the presence of any poor-performing clients, e.g., poor-performing VMs, in the cluster. In particular, the management system remediates such performance degradation by detecting poor-performing clients in the cluster and mitigating the effects of the poor-performing clients by, for example, restarting the poor-performing clients and/or application scaling.

Figure 3:
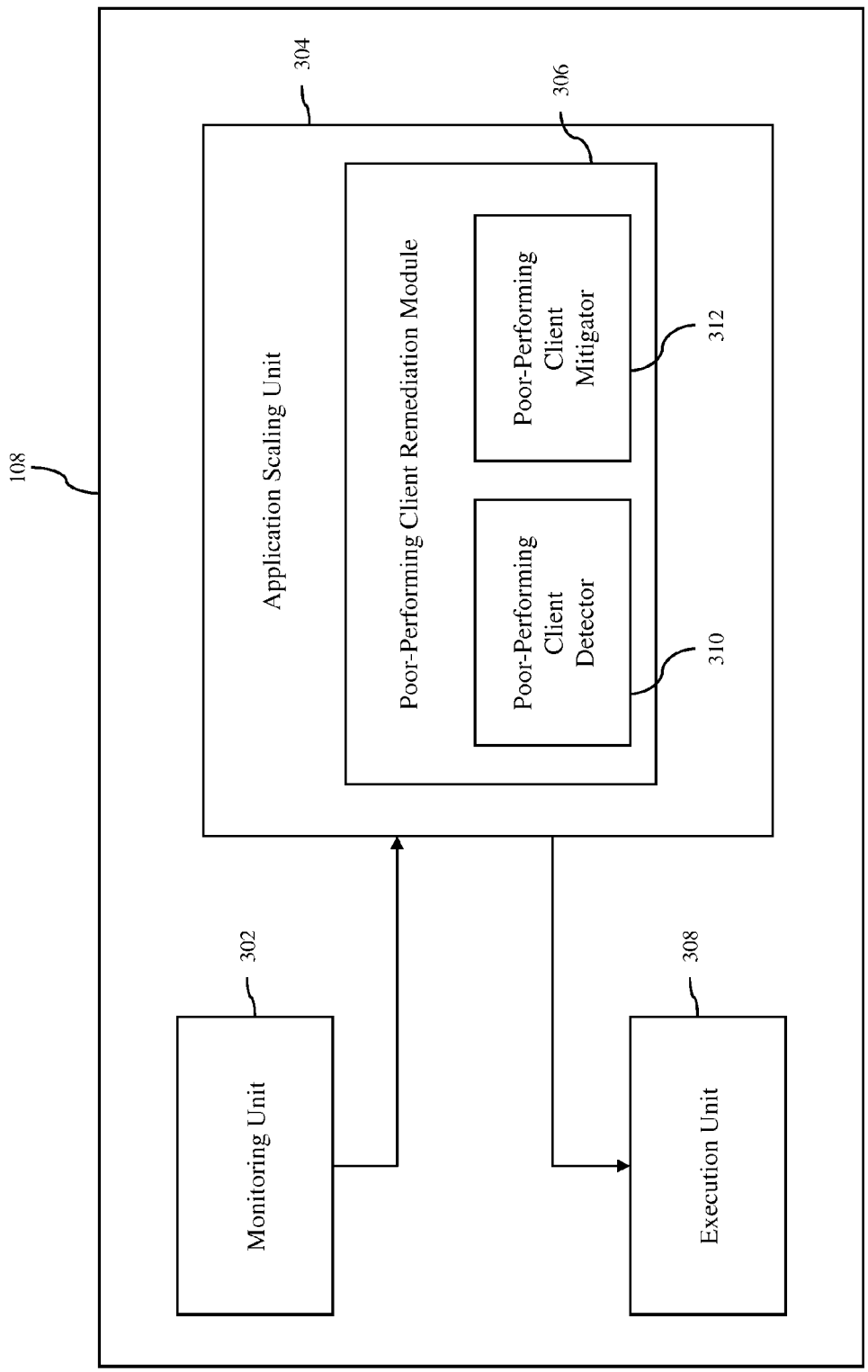
FIG. 3 is a block diagram of a management system included in the distributed computer system in accordance with an embodiment of the invention.

Turning FIG. 3, components of the management system 108 in accordance with an embodiment of the invention are shown. As shown in FIG. 3, the management system includes a monitoring unit 302, an application scaling unit 304 with a poor-performing client remediation module 306 and an execution unit 308. These components of the management system may be implemented in any combination of hardware, software and firmware. In one implementation, these components of the management system are implemented as one or more software programs running in one or more physical servers using one or more processors associated with or installed in the servers.

The monitoring unit 302 of the management system 108 operates to collect operational metrics from monitoring agents of various clients running in the distributed computer system 100, e.g., the monitoring agents 236 of the VMs 220A, 220B . . . 220L, which may be supporting one or more multi-tier applications. The operational metrics may include at least resource utilization metrics and performance metrics, which may be measured with respect to latency, with respect to the clients, e.g., VMs, supporting the multi-tier applications. The operational metrics may be received from the monitoring agents on a periodic basis. The monitoring unit gathers the received operational metrics and may store the data in a database. The monitoring unit may format the received metric data so that the data can be readily used by the application scaling unit 304. In an embodiment, the monitoring unit may be a Hyperic Server.

The application scaling unit 304 of the management system 108 operates to automatically scale a multi-tier application as needed by recommending adding or deleting clients, e.g., VMs, executing the multi-tier application based on the SLA target. In an embodiment, the application scaling unit performs autoscaling analysis based on reinforced learning, for example, Q learning, to make SLA target recommendations regarding the scale of different tiers of the multi-tier application, e.g., the number of VMs executing on the different tiers of the multi-tier application. The SLA target recommendations generated by the application scaling unit include (1) scale in a tier of the multi-tier application if the multi-tier application is currently performing sufficiently better than its SLA, (2) scale out a tier of the multi-tier application if the multi-tier application is currently performing sufficiently worse than its SLA, and (3) maintain the current scale of a tier of the multi-tier application if the multi-tier application is not currently performing sufficiently better or worse than its SLA. As described in more detail below, when one or more poor-performing clients, e.g., poor-performing VMs, are detected, these recommendations may specify that the one of the detected poor-performing clients be shut down to mitigate the effects of the poor-performing VMs.

In the illustrated embodiment, the application scaling unit 304 includes the poor-performing client remediation module 306, which operates to detect poor-performing clients in the cluster and to mitigate the effects of the poor-performing clients. In this embodiment, the poor-performing client remediation module is part of the application scaling unit. However, in other embodiments, the poor-performing client remediation module may be part of another entity or may be a standalone module. In the illustrated embodiment, as part of the application scaling unit, the poor-performing client remediation module uses the SLA target recommendations made by the application scaling unit to mitigate any detected poor-performing clients in the cluster, as described in more detail below.

As shown in FIG. 3, the poor-performing client remediation module 306 comprises a poor-performing client detector 310 and a poor-performing client mitigator 312. The poor-performing client detector operates to detect poor-performing clients, e.g., VMs, in the cluster 104 using a machine learning technique. The poor-performing client detector uses real-time observations with respect to client performance and client resource usage instead of relying on application models, which are prone to errors and subject to change depending on application and platform configuration. The poor-performing client detector takes advantage of the fact that applications, such as cloud applications, are typically deployed as a group of clients, e.g., VMs, running the same service for the purpose of scaling the application to support a large number of clients. Thus, any application can have multiple clients active of which a subset of the clients may be performing poorly compared to other clients in the same tier. The presence of multiple instances provides the poor-performing client detector a sample space where the performance of various clients can be correlated among each other to identify poor-performing clients. The poor-performing client detector uses the operational metrics, such as resource utilization metrics and performance metrics, from the monitoring unit 302 to detect poor-performing clients in the cluster 104 by comparing the relative operational metrics for the clients executing the same service for a tier of a multi-tier application.

In an embodiment, the poor-performing client detector 310 uses a classification machine learning technique to detect poor-performing clients, e.g., VMs, running in the distributed computer system 100. This technique falls under the category of supervised machine learning and makes use of an input training set to develop a model which is validated against the test set. This model can then be applied to new objects to classify them appropriately. For this technique, an input dataset of clients is required, where the clients are tagged or specified as being healthy or poor-performing for a particular tier of a multi-tier application. Using the input client dataset, a model is developed, which is used to determine whether each client for a tier of a multi-tier application belongs to a healthy client class or a poor-performing client class. In an implementation, the poor-performing client detector uses "OneR" classifier algorithm that generates one rule for each predictor in the input dataset and then selects the rule with the smallest total error. The selected rule is then used to classify each client as a healthy client or a poor-performing client to detect poor-performing VMs. For example, given a tagged dataset of healthy and poor-performing VMs and corresponding performance and resource utilization data, it could choose either a resource utilization threshold or a performance level threshold as its classification rule, depending on which rule provides higher accuracy.

In another embodiment, the poor-performing client detector 310 uses a clustering machine learning technique to detect poor-performing clients, e.g., VMs, running in the distributed computer system 100. This technique falls under the category of unsupervised machine learning, and thus, eliminates the need for a training dataset. This technique uses the input dataset to directly obtain the desired outcome (cluster of objects). Assuming various healthy and poor-performing clients for a tier in a multi-tier application have similar behavior, the healthy clients can be clustered together and the poor-performing clients can be clustered together, resulting in clusters of healthy and poor-performing clients. In an implementation, the poor-performing client detector uses a k-means clustering algorithm, which aims to partition n observations into k clusters in which each observation belongs to the cluster with the nearest mean, serving as a prototype of the cluster. Applied to poor-performing client detection, the k-means cluster algorithm partitions the clients into either a healthy client cluster or a poor-performing client cluster using the operational metrics, such as resource utilization metrics and performance metrics, received from the monitoring unit 302. A disadvantage of the clustering machine learning technique is that if poor-performing clients have undefined and diverse behavior, it may not be possible to cluster them together.

Figure 4:
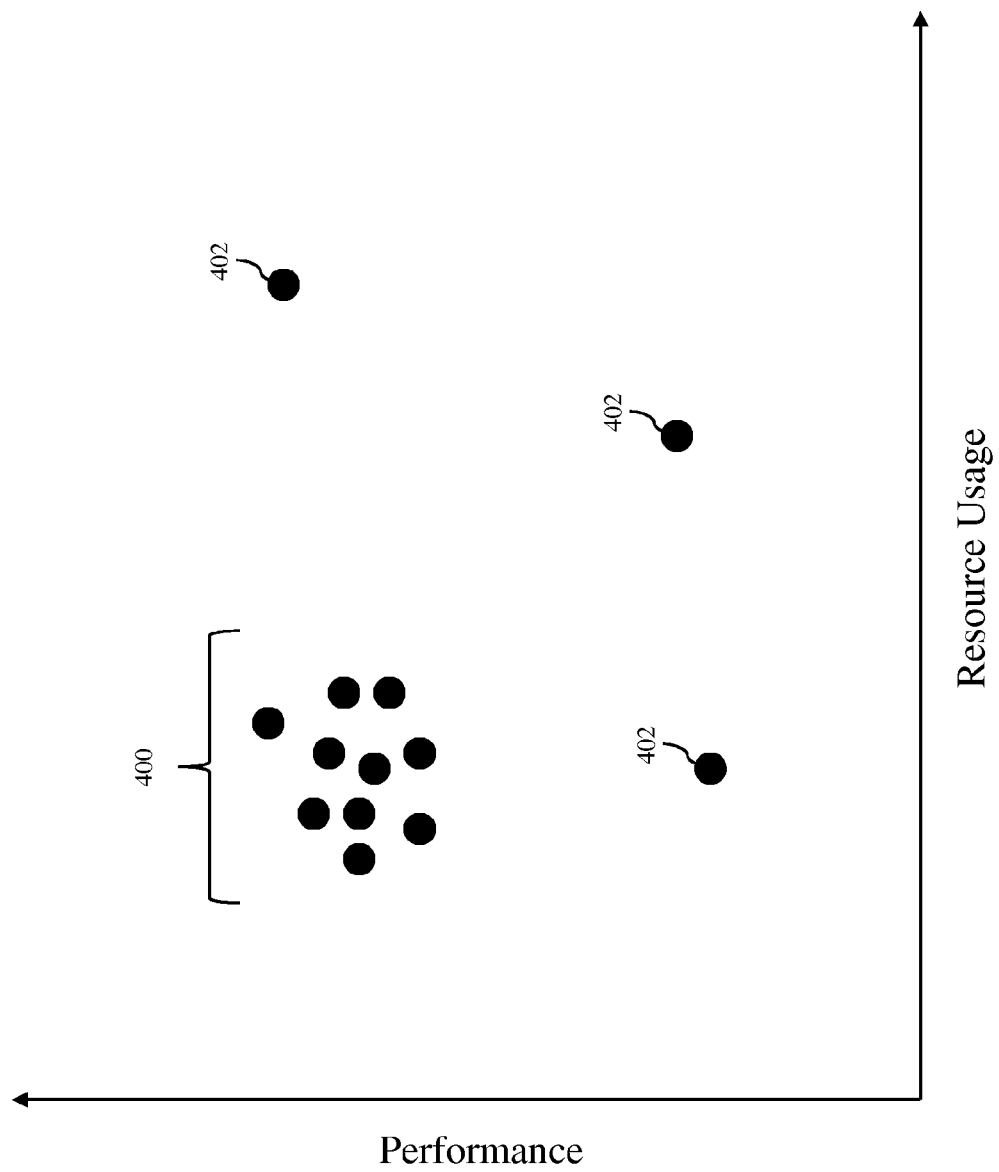
FIG. 4 illustrates an outlier machine learning technique in accordance with an embodiment of the invention.

In another embodiment, the poor-performing client detector 310 uses an outlier machine learning technique to detect poor-performing clients, e.g., VMs, running in the distributed computer system 100. This technique also falls under the category of unsupervised machine learning, and thus, eliminates the need for a training dataset. In addition, this technique does not require that poor-performing clients to behave in a specific manner to cluster them together. Among a group of clients for a tier of a multi-tier application, healthy clients can be clustered together due to their similar characteristics, resulting in few outlier clients showing different characteristics. As an example, in FIG. 4, most VMs, i.e., VMs 400, have similar performance and resource usage characteristics. These VMs can be identified as being healthy VMs. The few VMs, i.e., VMs 402, that have performance and resource usage characteristics that are different than the healthy VMs can be identified as being poor-performing VMs due to their poor performance or higher resource usage. This technique relies on the fact that poor-performing clients do not typically dominate healthy clients in numbers. However, in some scenarios, healthy clients can be identified as outliers and thus marked as poor-performing clients. Further, healthy clients can also form multiple clusters, not largely apart from each other, which may lead to some healthy clients being identified as poor-performing clients. In order to handle these types of scenarios, the poor-performing client detector may perform comparison of clients' performance to correctly identify poor-performing clients. For example, if the outlier VMs perform better than the normal VMs, it may imply that the a larger set of VMs in the cluster identified as normal VMs are actually in the unhealthy state.

In an implementation, the poor-performing client detector 310 uses a local outlier factor (LOF) algorithm to detect poor-performing clients in a tier of a multi-tier application. Leveraging k-nearest neighbor (k-NN) set, the LOF algorithm computes an outlier factor for each object (described below) which is used to identify outlier objects. A value close to one (1) indicates that the object is comparable to its neighbors (and thus not an outlier), while values significantly larger than one (1) indicate outliers. The outlier factor calculation is performed as follows.

1. Let's denote the set of k-nearest neighbors of object A as $N_k(A)$ and k-dist(A) be the distance of A to the k nearest neighbor.
2. This distance is used to define reachability distance as follows:

reach-dist$_k$(A,B)=max{k-dist(B),d(A,B)}

3. The local reachability density (lrd) of an object A is defined as the quotient of the average reachability distance of the object A from its neighbors.

$$lrd(A) = 1 \bigg/ \left( \frac{\sum_{B \in N_k(A)} \text{reach} - dist_k(A, B)}{|N_k(A)|} \right)$$

4. The local outlier factor is obtained as the average local reachability density of the neighbors divided by the object's own local reachability density as follows.

$$lof_k(A) = \frac{\sum_{B \in N_k(A)} \frac{lrd(B)}{lrd(A)}}{|N_k(A)|}$$

Using the outline factor for each client in a group of clients, e.g., clients executing the same service for a tier of a multi-tier application, the poor-performing client detector 310 determines which clients are outliers, and thus, are poor-performing clients.

The poor-performing client mitigator 312 operates to mitigate the effects of the detected poor-performing clients by initiating one or more appropriate actions. In addition, the poor-performing client mitigator may perform root cause analysis to find the potential source of the problem and apply the relevant action to mitigate the problem. For example, the poor-performing client mitigator can identify the source of the problem due to network problems on a host. Thus, the poor-performing client mitigator can move the VMs away from that host. Feedback can also be used to make intelligent decisions by applying a mitigation action and observing the resultant change in behavior and thus navigating to a remediation solution for the problem. Possible actions to mitigate the effects of the detected poor-performing clients include, but are not limited to, restarting the service within the detected poor-performing client, restarting the detected poor-performing client and scale (in/out) the application tier. It should be noted that a client migration may not alleviate the problem since clients are likely to have proportional load and resources, assuming the cluster load balancer and resource manager are fair.

In an embodiment, the poor-performing client mitigator 312 operates as part of a scaling recommendation engine of the application scaling unit 304 to account for any detected poor-performing clients. As noted above, the SLA target recommendations generated by the application scaling unit include (1) scaling in a tier of the multi-tier application if the multi-tier application is currently performing sufficiently better than its SLA, (2) scaling out a tier of the multi-tier application if the multi-tier application is currently performing sufficiently worse than its SLA, and (3) maintain the current scale of a tier of the multi-tier application if the multi-tier application is not currently performing sufficiently better or worse than its SLA. When one or more poor-performing clients are detected, the poor-performing client mitigator provides the following recommendations based on the SLA target recommendation:

(1) if the SLA target recommendation is scale-in, the recommendation is to scale-in one of the poor-performing clients, i.e., remove one of the poor-performing clients from the application tier;

(2) if the SLA target recommendation is maintain the current scale, the recommendation is to scale-in one of the poor-performing clients, i.e., remove one of the poor-performing clients from the application tier (this may result in a subsequent scale-out recommendation); and (3) if the SLA target recommendation is scale-out, the recommendation is to scale-in one of the poor-performing clients and scale out one client, i.e., remove one of the poor-performing clients from the application tier and add a client to the application tier (this may result in a subsequent scale-out recommendation, particularly if scale-out would have been recommended even if all clients were non-poor-performing or healthy clients).

In the illustrated embodiment, the recommendations from the poor-performing client mitigator 312 are used as outputs of the application scaling unit 304, which are transmitted to the execution unit 308 of the management system 108.

The execution unit 308 of the management system 108 operates to receive autoscaling recommendations from the application scaling unit 304 and automatically execute those recommendations. Thus, the execution unit is configured to add clients, e.g., VMs, to the tiers of the multi-tier application and/or to remove clients, e.g., VMs, from the tiers of the multi-tier application. In particular, the execution unit is able to remove a specific client from a particular tier of the multi-tier application. Consequently, the execution unit can fulfill any recommendation to scale-in or remove a particular poor-performing VM. In an embodiment, the execution unit may be a VMware vCloud® Application Director™ ("VMware vCloud" and "Application Director" are trademarks of VMware, Inc.).

Figure 5:
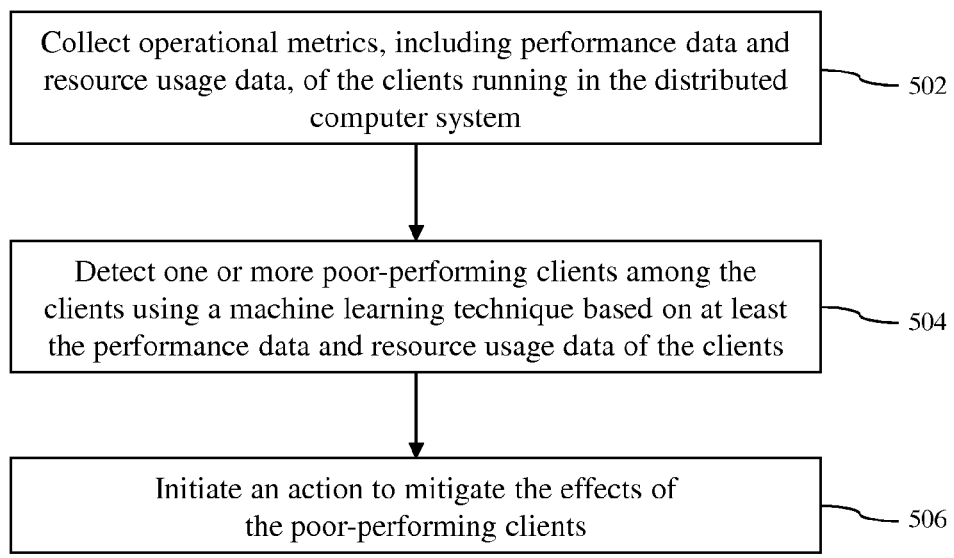
FIG. 5 is a flow diagram of a method for remediating poor-performing clients running in a distributed computer system in accordance with an embodiment of the invention.

A method for remediating poor-performing clients, e.g., poor-performing VMs, running in a distributed computer system in accordance with an embodiment of the invention is described with reference to a flow diagram of FIG. 5. At block 502, operational metrics, including performance data and resource usage data, of the clients running in the distributed computer system are collected. In an embodiment, the monitoring unit of the management system collects the operational metrics from the monitoring agents of the clients, e.g., VMs, which are supporting a multi-tier application. At block 504, one or more poor-performing clients among the clients running in the distributed computer system are detected using a machine learning technique based on at least the performance data and resource usage data of the clients. In an embodiment, the poor-performing VM detector of the poor-performing VM remediation module detects the poor-performing clients, e.g., poor-performing VMs, using a machine learning technique. In one embodiment, the poor-performing clients are detected using a classification machine learning technique. In another embodiment, the poor-performing clients are detected using a clustering machine learning technique. Still in another embodiment, the poor-performing clients are detected using an outlier machine learning technique. In a particular implementation, the poor-performing clients are detected using outlier machine learning technique by executing the LOF algorithm. At block 506, an action is initiated to mitigate the effects of the poor-performing clients. In an embodiment, the poor-performing VM mitigator of the poor-performing VM remediation module initiates the action to mitigate the effects of the poor-performing clients, which may include, but are not limited to, restarting the service within the detected poor-performing VMs, restarting the detected poor-performing VMs and scale (in/out) one or more tiers of the multi-tier application. In this embodiment, the action is then executed by the execution unit of the management system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for remediating poor-performing clients running in a distributed computer system, the method comprising:

automatically detecting a poor-performing client among a plurality of clients running in the distributed computer using a machine learning technique based on performance data and resource usage data of the clients, including applying an outlier detection machine learning technique on the clients running in the distributed computer system to identify any outlier client among the clients with respect to the performance and resource usage data to identify the poor-performing client, wherein the applying the outlier detection machine learning technique includes executing a local outlier factor algorithm to compute an outlier factor for each of the clients by dividing an average local reachability density of neighbors of a client by the client's own local reachability density to determine whether each of the clients is an outlier or is not an outlier; and initiating an action to mitigate effects of the poor-performing client.

2. The method of claim 1, wherein the automatically detecting the poor-performing client includes applying a classification machine learning technique on the clients running in the distributed computer system to classify the clients into a poor-performing client class and a healthy client class to identify the poor-performing client.

3. The method of claim 1, wherein the automatically detecting the poor-performing client includes applying a clustering machine learning technique on the clients running in the distributed computer system to cluster the clients into a poor-performing client cluster and a healthy client cluster class to identify the poor-performing client.

4. The method of claim 1, wherein the outlier factor for each of the clients is defined as:

$$lof_k(A) = \frac{\sum_{B \in N_k(A)} \frac{lrd(B)}{lrd(A)}}{|N_k(A)|},$$

where $N_k(A)$ is a set of k-nearest neighbors of object A, lrd(A) is a local reachability density of object A and lrd(B) is a local reachability density of object B, wherein the object B is an element of $N_k(A)$.

5. The method of claim 4, wherein the local reachability density of the object A is defined as the quotient of the average reachability distance of the object A from its k-nearest neighbors, $$lrd(A) = 1 \Big/ \left( \frac{\sum_{B \in N_k(A)} \text{reach-}dist_k(A, B)}{|N_k(A)|} \right),$$

where reach-$dist_k(A,B)$ is defined as:

reach-$dist_k(A,B)$=max$\{k$-dist$(B),d(A,B)\}$, where d(A,B) is the distance of the object A from the object B.

6. The method of claim 1, wherein the initiating the action includes initiating restarting of the poor-performing client or restarting of a program running in the poor-performing client.

7. The method of claim 1, wherein the initiating the action includes initiating shutting down of the poor-performing client as part of an application scaling recommendation.

8. A non-transitory computer-readable storage medium containing program instructions for method for remediating poor-performing clients running in a distributed computer system, wherein execution of the program instructions by one or more processors of a computer system causes the one or more processors to perform steps comprising:

automatically detecting a poor-performing client among a plurality of clients running in the distributed computer using a machine learning technique based on performance and resource usage data of the clients, including applying an outlier detection machine learning technique on the clients running in the distributed computer system to identify any outlier client among the clients with respect to the performance and resource usage data to identify the poor-performing client, wherein the applying the outlier detection machine learning technique includes executing a local outlier factor algorithm to compute an outlier factor for each of the clients by dividing an average local reachability density of neighbors of a client by the client's own local reachability density to determine whether each of the clients is an outlier or is not an outlier; and initiating an action to mitigate effects of the poor-performing client.

9. The non-transitory computer-readable storage medium of claim 8, wherein the automatically detecting the poor-performing client includes applying a classification machine learning technique on the clients running in the distributed computer system to classify the clients into a poor-performing client class and a healthy client class to identify the poor-performing client.

10. The non-transitory computer-readable storage medium of claim 8, wherein the automatically detecting the poor-performing client includes applying a clustering machine learning technique on the clients running in the distributed computer system to cluster the clients into a poor-performing client cluster and a healthy client cluster class to identify the poor-performing client.

11. The non-transitory computer-readable storage medium of claim 8, wherein the outlier factor for each of the clients is defined as:

$$lof_k(A) = \frac{\sum_{B \in N_k(A)} \left( \frac{lrd(B)}{lrd(A)} \right)}{|N_k(A)|},$$

where $N_k(A)$ is a set of k-nearest neighbors of object A, lrd(A) is a local reachability density of object A and lrd(B) is a local reachability density of object B, wherein the object B is an element of $N_k(A)$.

12. The non-transitory computer-readable storage medium of claim 11, wherein the local reachability density of the object A is defined as the quotient of the average reachability distance of the object A from its k-nearest neighbors, $$lrd(A) = 1 \bigg/ \left( \frac{\sum_{B \in N_k(A)} \text{reach-}dist_k(A, B)}{|N_k(A)|} \right),$$

where reach-$dist_k$(A,B) is defined as:

reach-$dist_k$(A,B)=max{k-dist(B),d(A,B)}, where d(A,B) is the distance of the object A from the object B.

13. The non-transitory computer-readable storage medium of claim 8, wherein the initiating the action includes initiating restarting of the poor-performing client or restarting of a program running in the poor-performing client.

14. The non-transitory computer-readable storage medium of claim 8, wherein the initiating the action includes initiating shutting down of the poor-performing client as part of an application scaling recommendation.

15. A management system supported by hardware in a distributed computer system comprising:

a poor-performing client detector configured to automatically detect a poor-performing client among a plurality of clients running in the distributed computer using a machine learning technique based on performance data and resource usage data of the clients, wherein the poor-performing client detector is configured to apply an outlier detection machine learning technique on the clients running in the distributed computer system to identify any outlier client among the clients with respect to the performance and resource usage data to identify the poor-performing client, wherein the poor-performing client detector is configured to execute a local outlier factor algorithm to compute an outlier factor for each of the clients by dividing an average local reachability density of neighbors of a client by the client's own local reachability density to determine whether each of the clients is an outlier or is not an outlier; and a poor-performing client mitigator configured to initiate an action to mitigate effects of the poor-performing client.

16. The management system of claim 15, wherein the poor-performing client detector is configured to apply a classification machine learning technique on the clients running in the distributed computer system to classify the clients into a poor-performing client class and a healthy client class to identify the poor-performing client.

17. The management system of claim 15, wherein the poor-performing client detector is configured to apply a clustering machine learning technique on the clients running in the distributed computer system to cluster the clients into a poor-performing client cluster and a healthy client cluster class to identify the poor-performing client.

18. The management system of claim 15, wherein the outlier factor for each of the clients is defined as:

$$lof_k(A) = \frac{\sum_{B \in N_k(A)} \left( \frac{lrd(B)}{lrd(A)} \right)}{|N_k(A)|},$$

where $N_k(A)$ is a set of k-nearest neighbors of object A, lrd(A) is a local reachability density of object A and lrd(B) is a local reachability density of object B, wherein the object B is an element of $N_k(A)$.

19. The management system of claim 18, wherein the local reachability density of the object A is defined as the quotient of the average reachability distance of the object A from its k-nearest neighbors, $$lrd(A) = 1 \bigg/ \left( \frac{\sum_{B \in N_k(A)} \text{reach-}dist_k(A, B)}{|N_k(A)|} \right),$$

where reach-$dist_k$(A,B) is defined as:

reach-$dist_k$(A,B)=max{k-dist(B),d(A,B)}, where d(A,B) is the distance of the object A from the object B.

20. The management system of claim 15, wherein the poor-performing client mitigator is configured to initiate restarting of the poor-performing client or restarting of a program running in the poor-performing client.

21. The management system of claim 15, wherein the poor-performing client mitigator is configured to initiate shutting down of the poor-performing client as part of an application scaling recommendation.

* * * * *